United States Patent
Liao

(10) Patent No.: US 9,784,407 B2
(45) Date of Patent: Oct. 10, 2017

(54) OPTICAL TOUCH SYSTEM, LIGHT CURTAIN GENERATING MODULE AND ADJUSTING STRUCTURE

(71) Applicant: Coretronic Corporation, Hsin-Chu (TW)

(72) Inventor: Chien-Ting Liao, Hsin-Chu (TW)

(73) Assignee: CORETRONIC CORPORATION, Hsin-Chu (TW)

( * ) Notice: Subject to any disclaimer, the term of this patent is extended or adjusted under 35 U.S.C. 154(b) by 139 days.

(21) Appl. No.: 14/808,781

(22) Filed: Jul. 24, 2015

(65) Prior Publication Data

US 2016/0179291 A1    Jun. 23, 2016

(30) Foreign Application Priority Data

Dec. 17, 2014  (CN) .......................... 2014 1 0784430

(51) Int. Cl.
*G06F 3/042*  (2006.01)
*F16M 13/02*  (2006.01)

(52) U.S. Cl.
CPC ........... *F16M 13/02* (2013.01); *G06F 3/0423* (2013.01)

(58) Field of Classification Search
CPC .. G06F 3/0425; G06F 3/0354; G06F 3/03542; G06F 3/0386; G06F 3/0416; G06F 3/0418; G06F 3/042; G06F 3/0428; F21V 21/14; F21V 5/04; G03B 21/134; H04N 5/351; H04N 9/3179; H04N 9/31
See application file for complete search history.

(56) References Cited

U.S. PATENT DOCUMENTS

| 2011/0083109 | A1 | 4/2011 | Hildebrandt et al. |
| 2014/0267193 | A1* | 9/2014 | Barton ............. G06F 3/0386 345/182 |
| 2015/0355781 | A1* | 12/2015 | Lin .................. G06F 3/0425 345/175 |

FOREIGN PATENT DOCUMENTS

TW           M328974 U    2/2008

* cited by examiner

*Primary Examiner* — Insa Sadio
(74) *Attorney, Agent, or Firm* — Li-Jen Shen

(57) ABSTRACT

An adjusting structure includes a first plate, a second plate opposite to the first plate, a first connection element, a second connection element and a third connection element. The second plate has a first connection portion, a second connection portion, and a third connection portion. The first connection element has a first spherical portion and a first rod. The first spherical portion is rotatably coupled to the first connection portion. The first rod is engaged through the first spherical portion and rotatably fixed to the first plate. The second connection element has a second spherical portion and a second rod. The second spherical portion is rotatably coupled to the second connection portion. The second rod is engaged through the second spherical portion and rotatably fixed to the first plate. The third connection element is connected to the second plate and the first plate.

18 Claims, 8 Drawing Sheets

OPTICAL TOUCH SYSTEM, LIGHT CURTAIN GENERATING MODULE AND ADJUSTING STRUCTURE

FIELD OF THE INVENTION

The present invention relates to an optical touch system, a light curtain generating module and an adjusting structure, and more particularly to an optical touch system, a light curtain generating module and an adjusting structure capable of adjusting an angle between a light curtain and a display surface.

BACKGROUND OF THE INVENTION

In recent years, a display surface for a projection apparatus or a display apparatus is usually implemented with a touch function. Instead of using the mechanical button for a specific operation, a user can operate with the displayed or projected images by directly touching the display surface with an object or his/her finger. Basically, the touch screens can be divided into resistive, capacitive, and optical types. The optical touch screen uses an optical sensing element to receive the beams reflected by the finger or the object and determines the position of the finger or the object on the touch screen or performs the corresponding operation instructions.

The optical touch system performs the touch operation by analyzing the beam reflected by the user's finger or the object and determining the position of the finger or the object on the touch screen. In order to provide suitable touch sensitivity, the light curtain has to be disposed with a proper distance with respect to the display surface in the optical touch system. If the distance between the light curtain and the display surface is relatively large, a part of the light curtain is reflected and detected by the optical touch system even when the user's finger or the object is relatively away from the screen. As a result, the optical touch system may have too high touch sensitivity. On the contrary, if the distance between the light curtain and the display surface is relatively small, the light curtain will not be reflected and detected by the optical touch system unless the user's finger or object is very close to the screen. As a result, the optical touch system may have too low touch sensitivity. It is quite inconvenient for a user to operate the optical touch system no matter the touch sensitivity of the optical touch system is too high or too low.

Moreover, when the screen of the optical touch system is disposed on a tilted wall, the light curtain generated by a light-emitting device may be also tilted with respect to the display surface of the screen. The touch sensitivity of the optical touch system may therefore be affected, which would be inconvenient to a user for operation.

Publications related to optical touch systems have been disclosed, such as US patent application No. 2011/0083109.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

One object of the present invention is to provide an optical touch system capable of adjusting the light angle of a light curtain.

Other objects and advantages of the invention can be further illustrated by the technical features broadly embodied and described as follows.

In order to achieve one or a portion of or all of the objects or other objects, an embodiment of the invention provides an adjusting structure. The adjusting structure includes a first plate, a second plate, a first connection element, a second connection element, and a third connection element. The first plate and the second plate are opposite to each other. The second plate is adapted to couple an optical element and has a first connection portion, a second connection portion, and a third connection portion. The first connection element has a first spherical portion and a first rod. The first spherical portion is rotatably coupled to the first connection portion of the second plate. The first rod passes through and is engaged with the first spherical portion and is rotatably fixed to the first plate. The second connection element has a second spherical portion and a second rod. The second spherical portion is rotatably coupled to the second connection portion of the second plate. The second rod passes through and is engaged with the second spherical portion and is rotatably fixed to the first plate. The third connection element is connected to the second plate and the first plate and has a third spherical portion. The third spherical portion is rotatably coupled to the third connection portion of the second plate. The second connection portion and the third connection portion are located on a first axis. The first connection portion and the third connection portion are located on a second axis. The first spherical portion is adapted to move with respect to the first rod to drive the second plate to rotate with respect to the first plate about the first axis when the first rod rotates. The second spherical portion is adapted to move with respect to the second rod to drive the second plate to rotate with respect to the first plate about the second axis when the second rod is rotates. The first axis is not parallel to the second axis.

In one embodiment, the first spherical portion has a top surface and a bottom surface, and both of the top surface and the bottom surface of the first spherical portion are flat surfaces. The second spherical portion has a top surface and a bottom surface, and both of the top surface and the bottom surface of the second spherical portion are flat surfaces.

In one embodiment, the first connection element includes a first elastic element mounted to the first rod and abuts against a bottom surface of the first connection portion. The second connection element includes a second elastic element mounted to the second rod and abuts against a bottom surface of the second connection portion.

In one embodiment, the first connection portion includes a first slot for containing the first spherical portion. The first slot has a first arc surface formed on an inner surface thereof. The second connection portion includes a second slot for containing the second spherical portion. The second slot has a second arc surface formed on an inner surface thereof. The third connection portion includes a third slot for containing the third spherical portion. The third slot has a third arc surface formed on an inner surface thereof.

In one embodiment, the first arc surface and an outer surface of the first spherical portion match with each other in shape. The second arc surface and an outer surface of the second spherical portion match with each other in shape.

The third arc surface and an outer surface of the third spherical portion match with each other in shape.

In one embodiment, the third connection element includes a third rod. The third rod passes through and is engaged with the third spherical portion and is rotatably fixed to the first plate. The first connection portion and the second connection portion are located on a third axis. The third spherical portion is adapted to move with respect to the third rod and drives the second plate to rotate with respect to the first plate about the third axis when the third rod rotates. The first axis, the second axis, and the third axis are not parallel to one another.

In one embodiment, the third spherical portion has a top surface and a bottom surface, and both of the top surface and the bottom surface of the third spherical portion are flat surfaces.

In one embodiment, the third connection element includes a third elastic element mounted on the third rod and abuts against a bottom surface of the third connection portion.

In one embodiment, the first rod, the second rod and the third rod are adapted to corporately rotate to drive the first spherical portion, the second spherical portion, and the third spherical portion to move with a same distance with respect to the first rod, the second rod, and the third rod, respectively, so that the second plate is adapted to in parallel moves with the same distance with respect to the first plate.

In one embodiment, the first rod has threads and the first spherical portion has threads, the first rod is engaged with the first spherical portion via the threads of the first rod and the threads of the first spherical portion, and the second rod has threads and the second spherical portion has threads, the second rod is engaged with the second spherical portion via the threads of the second rod and the threads of the second spherical portion.

In one embodiment, the third rod has threads and the third spherical portion has threads, and the third rod is engaged with the third spherical portion via the threads of the third rod and the threads of the third spherical portion.

In order to achieve one or a portion of or all of the objects or other objects, an embodiment of the invention provides a light curtain generating module, which includes the aforementioned adjusting structure and a light-emitting device. The light-emitting device is disposed on the second plate of the adjusting structure and is capable of emitting a light curtain.

In one embodiment, the light-emitting device includes a light-emitting element and the light-emitting element is a laser.

In one embodiment, the light curtain is adjusted to be parallel to a surface of the first plate by the adjusting structure.

In order to achieve one or a portion of or all of the objects or other objects, an embodiment of the invention provides an optical touch system. The optical touch system includes a light curtain generating module and a sensing module. The light curtain generating module includes the aforementioned adjusting structure and a light-emitting device. The adjusting structure is disposed adjacent to a display surface. The light-emitting device is disposed on the second plate of the adjusting structure and is capable of emitting a light curtain. The sensing module is adapted to receive a light beam reflected from the light curtain.

In one embodiment, the light curtain is adjusted to be parallel to a surface of the first plate by the adjusting structure.

The distance between the light curtain generated by the optical touch system of the embodiments of the present invention and the display surface is adjustable by operating the first connection element and the second connection element of the adjusting structure. The light curtain can be approximately parallel to the display surface and keep a certain distance with the display surface to obtain stable touch sensitivity of the optical touch system. Because the first connection element, the second connection element, and the third connection element are connected to the second plate by spherical portions respectively, the first connection element, the second connection element and the third connection element rotate to drive the second plate to rotate with respect to the first spherical portion, the second spherical portion and the third spherical portion stably. Therefore, the second plate can move or rotate with respect to the first plate stably to adjust exactly an emitting angle of the light curtain with respect to the display surface.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
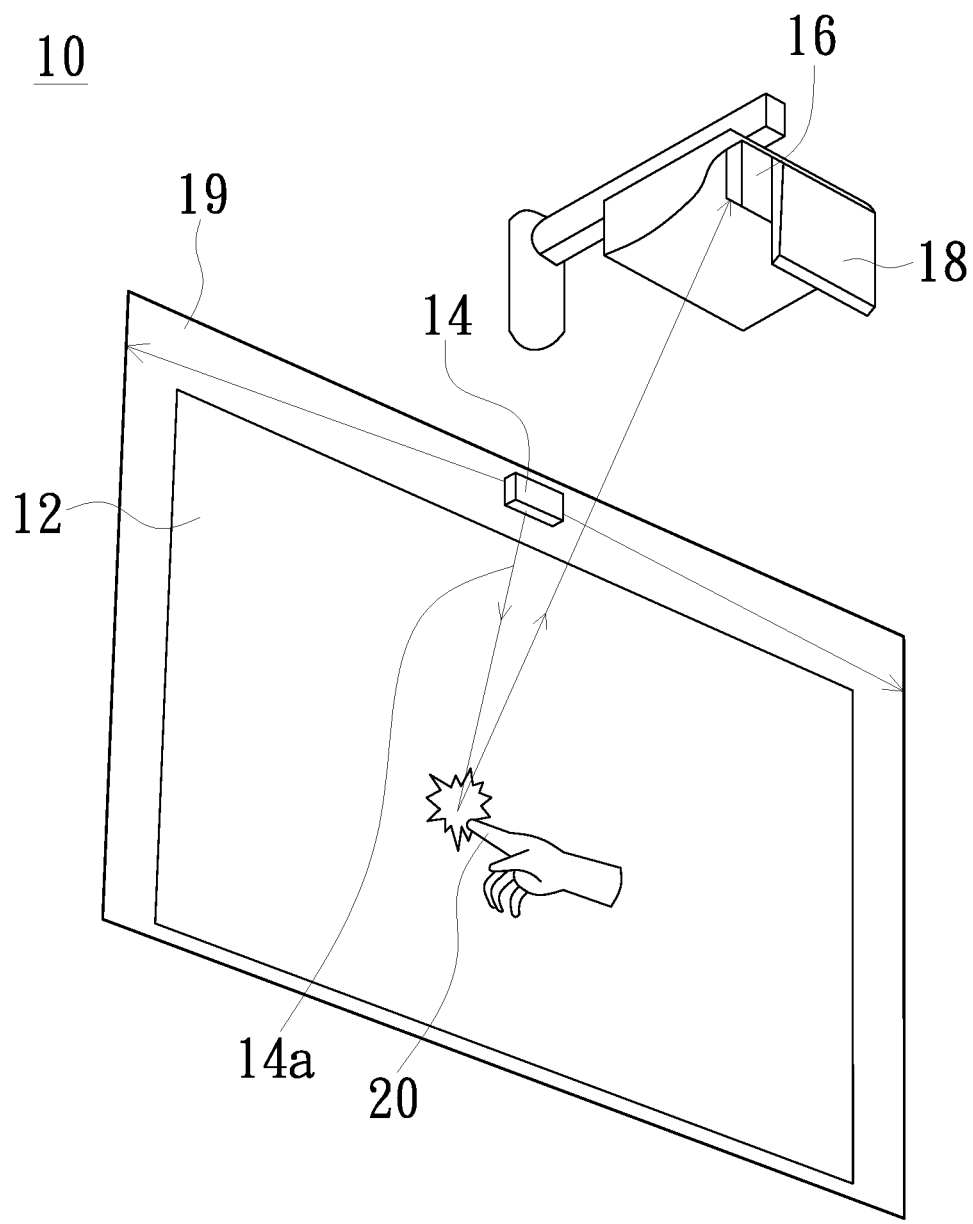
FIG. 1 is a schematic view of an optical touch system in accordance with an embodiment of the present invention.

Please refer to FIG. 1 which is a schematic view of an optical touch system in accordance with an embodiment of the present invention. The optical touch system 10 in the present embodiment includes a light curtain generating module 14 and a sensing module 16. The light curtain generating module 14 is disposed adjacent to a display surface 12 and forms a light curtain 14a. The display surface 12 may be part of a projection screen 19 or a wall on which an image can be projected by a projection apparatus 18. In one embodiment, the optical touch system 10 may further comprise the display surface 12. The projection apparatus 18 may be connected a computer (not shown) or a notebook (not shown) for receiving images or videos to project on the projection screen. In another embodiment, the display surface 12 may be a screen of a display device. The sensing module 16 may be, for example, a camera, a complementary metal oxide semiconductor (CMOS), or a charge-coupled device CCD. The light curtain 14a is parallel to and covers above the display surface 12. A user can perform an operation with images on the display surface 12 through the light curtain 14a. In one embodiment, the light curtain 14a is a laser light curtain. In another embodiment, the light curtain 14a may be an infrared laser light curtain, and the sensing module 16 may be an infrared camera; however, the present invention is not limited thereto.

In one embodiment, when a user puts his/her finger 20 on the light curtain 14a formed above the display surface 12, a part of the light curtain 14a is reflected by the finger 20 and is then received by the sensing module 16. The sensing module 16 analyzes the received reflected light and accordingly obtains a position of the finger 20 with respect to the display surface 12. The sensing module 16 may further issue an instruction corresponding to the position of the finger 20 with respect to the display surface 12 for the user to perform a corresponding operation; however, the present invention is not limited thereto. In another embodiment, the projection apparatus 18 may project the corresponding images based on the position of the finger 20 on the display surface 12. Instead of using fingers, a user may insert an object (not shown) into the light curtain 14a formed above the display surface 12 so as to reflect a part of the light curtain 14a to the sensing module 16. In one embodiment, the aforementioned object is a stylus; however, the present invention is not limited thereto.

Figure 2:
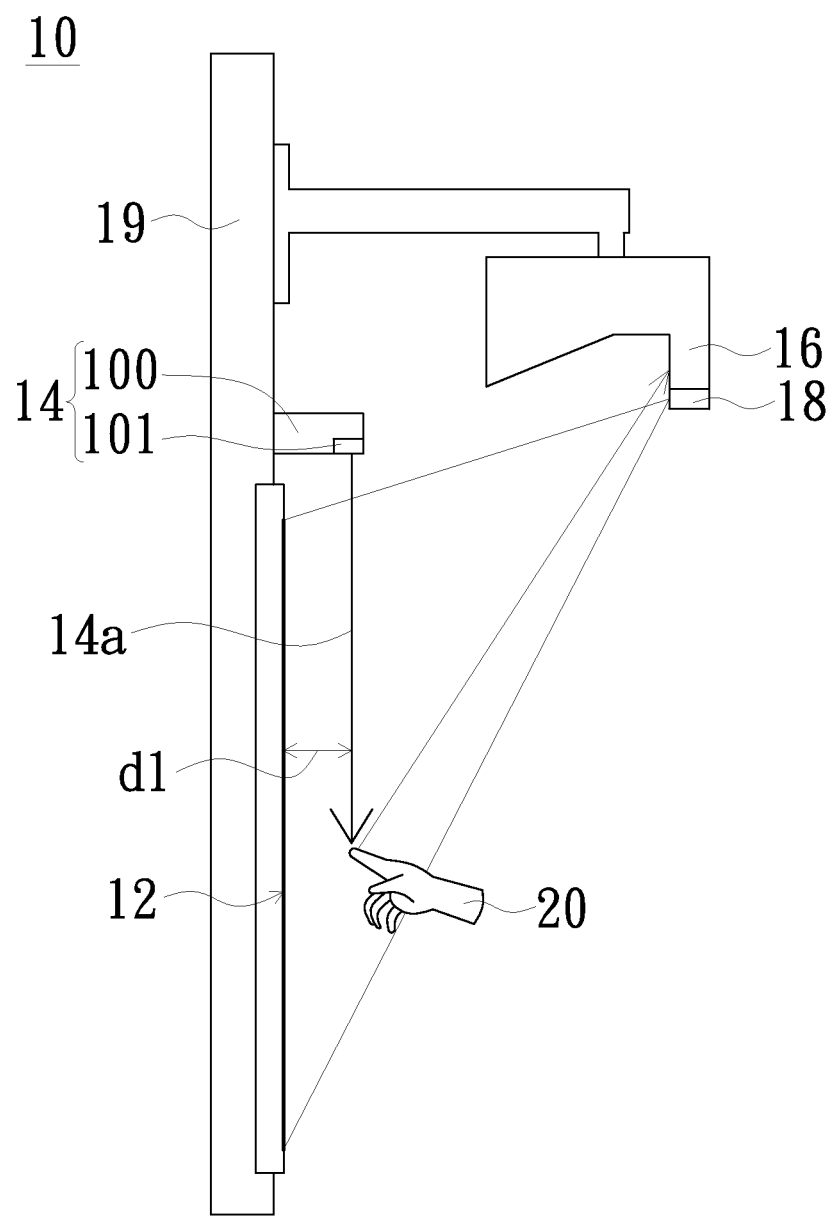
FIG. 2 is a schematic side view of the optical touch system in FIG. 1.

Please refer to FIG. 2 which is a schematic side view of the optical touch system of FIG. 1. As shown in FIG. 2, the light curtain generating module 14 includes a light-emitting device 101 and an adjusting structure 100. It is to be noted that the structure of the adjusting structure 100 illustrated in FIG. 2 is only for an exemplary purpose, and the structure of the adjusting structure 100 will be describe in detail in FIG. 3 as follows.

In this embodiment, the light-emitting device 101 is disposed on the adjusting structure 100 for emitting the light curtain 14a. The light-emitting device 101 includes a light-emitting element (not shown) and a diffusion optical element (not shown). The light-emitting element may be an infrared laser device for emitting infrared beams. The diffusion optical element, such as an optical lens, is for diffusing the infrared beams emitted by the light-emitting element to form an infrared curtain. The adjusting structure 100 is disposed adjacent to a top edge of the display surface 12. Through the adjusting structure 100, the light curtain 14a emitted by the light-emitting device 101 can be driven to change a distance with respective to the display surface 12. The light curtain 14a is substantially parallel to the display surface 12 and there exists a proper distance d1 between the light curtain 14a and the display surface 12 to provide suitable touch sensitivity.

Figure 3:
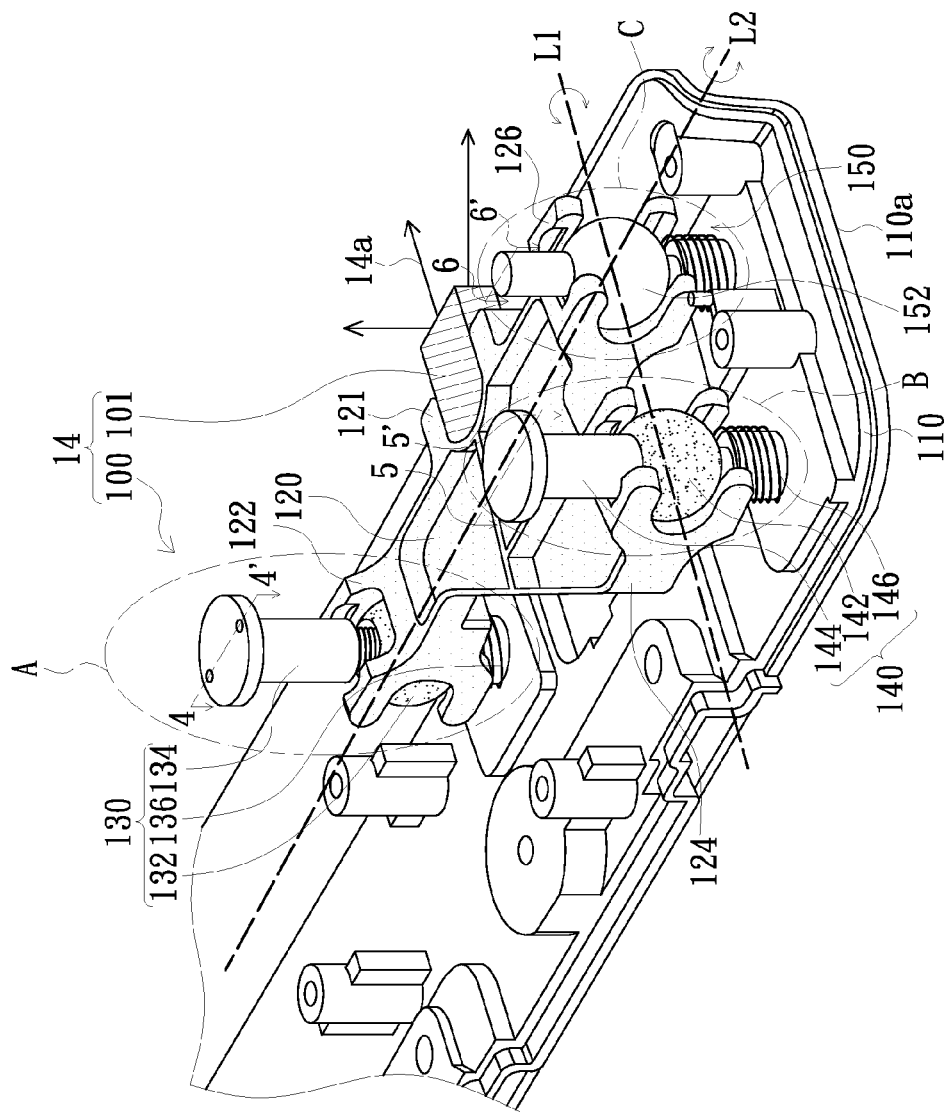
FIG. 3 is a schematic three-dimensional view of an embodiment of a light curtain generating module of the optical touch system in FIG. 1.

Please refer to FIG. 3 which is a schematic three-dimensional view of a light curtain generating module of the optical touch system in FIG. 1 in accordance with an embodiment of the present invention. As shown in FIG. 3, the light curtain generating module 14 in this embodiment comprises the light-emitting device 101 and the adjusting structure 100. The light-emitting device 101 is assembled to the adjusting structure 100. In one embodiment, the adjusting structure 100 includes a first plate 110, a second plate 120, a first connection element 130, a second connection element 140, and a third connection element 150. The first plate 110 and the second plate 120 are disposed opposite to each other. The first plate 110 may be disposed adjacent to the display surface 120 (as shown in FIG. 1) or disposed directly on the display surface 12; however, the present invention is not limited thereto. The first connection element 130, the second connection element 140, and the third connection element 150 are corporately connected to the first plate 110 and the second plate 120.

In this embodiment, the second plate 120 includes an optical coupling portion 121 which is used to couple an optical element, such as the light-emitting device 101 for emitting the light curtain 14a; however, the present invention is not limited thereto. In another embodiment, the optical coupling portion 121 is for coupling other related optical elements (not shown) such as reflection lenses or filters, through which the light-emitting direction of the beams is adjustable; however, the present invention is not limited thereto. The optical coupling portion may be, for example, a hole, a slot, a cavity, a clamp-shape structure, a U shape structure, a screw, or combination thereof. Additionally, the second plate 120 includes a first connection portion 122, a second connection portion 124, and a third connection portion 126, which are connected to the first connection element 130, the second connection element 140, and the third connection element 150, respectively. The light curtain 14a can be adjusted to be parallel to a surface of the first plate 110 via the adjusting structure 100; wherein the surface is a fixing surface of the first plate 110 that the first plate 110 is used to be disposed on a flat surface. In other words, the light curtain 14a may be parallel to a bottom surface 110a of the first plate 110; however, the present invention is not limited thereto. In another embodiment, the light curtain 14a may be parallel to a top surface of the first plate 110.

In one embodiment, the first connection element 130 includes a first spherical portion 132 and a first rod 134. The first spherical portion 132 is rotatably coupled to the first connection portion 122 of the second plate 120. The first rod 134 passes through and is engaged with the first spherical portion 132 via, for example, screwing and is rotatably fixed to the first plate 110. The second connection element 140 includes a second spherical portion 142 and a second rod 144. The second spherical portion 142 is rotatably coupled to the second connection portion 124 of the second plate 120. The second rod 144 passes through and is engaged with the second spherical portion 142 via, for example, screwing and is rotatably fixed to the first plate 110. The third connection element 150 may be connected to both of the second plate 120 and the first plate 110. The third connection element 150 includes a third spherical portion 152. The third spherical portion 152 is rotatably coupled to the third connection portion 126 of the second plate 120.

In one embodiment, the second connection portion 124 and the third connection portion 126 are disposed along a first axis L1, and the first connection portion 122 and the third connection portion 126 are disposed along a second axis L2. In other words, the connection line between the second connection portion 124 and the third connection portion 126 forms the first axis L1, and the connection line between the first connection portion 122 and the third connection portion 126 forms the second axis L2. In one embodiment, the center of the second spherical portion 142 and the center of the third spherical portion 152 are located on the first axis L1, and the center of the first spherical portion 132 and the center of the third spherical portion 152 are located on the second axis L2.

In one embodiment, the first spherical portion 132 has a through hole provided with threads. The first spherical portion 132 and the first rod 134 of the first connection element 130 are coupled to each other via threads (exemplarily shown in FIG. 4). When the first rod 134 rotates, the first spherical portion 132 moves with respect to the first rod 134 and drives the first connection portion 122 of the second plate 120 so as to rotate the second plate 120 with respect to the first plate 110 about the first axis L1. For example, when the first spherical portion 132 is driven to rotate by the first rod 134 and move toward the first plate 110, the second plate 120 is driven to rotate toward the first plate 110 about the first axis L1, so that the first connection portion 122 of the second plate 120 is driven to be close to the first plate 110. Alternatively, when the first spherical portion 132 is driven to rotate by the first rod 134 and move away from the first plate 110, the second plate 120 is driven to rotate away from the first plate 110 about the first axis L1, so that the first connection portion 122 of the second plate 120 is driven to move away from the first plate 110.

Similarly, the second spherical portion 132 has a through hole provided with threads. The second spherical portion 142 and the second rod 144 of the second connection element 140 are coupled to each other via threads (exemplarily shown in FIG. 5). When the second rod 144 rotates, the second spherical portion 142 moves with respect to the second rod 144 and drives the second connection portion 124 of the second plate 120 so as to rotate the second plate 120 with respect to the first plate 110 about the second axis L2. For example, when the second spherical portion 142 is driven to rotate by the second rod 144 and move toward the first plate 110, the second plate 120 is driven to rotate toward the first plate 110 about the second axis L2, so that the second connection portion 124 of the second plate 120 is driven to be close to the first plate 110. Alternatively, when the second spherical portion 142 is driven to rotate by the second rod 144 and move away from the first plate 110, the second plate 120 is driven to rotate away from the first plate 110 about the second axis L2, so that the second connection portion 124 of the second plate 120 is driven to move away from the first plate 110. It is to be noted that the first axis L1 and the second axis L2 are not parallel to each other; in other words, the first axis L1 and the second axis L2 intersect each other.

Figure 4:
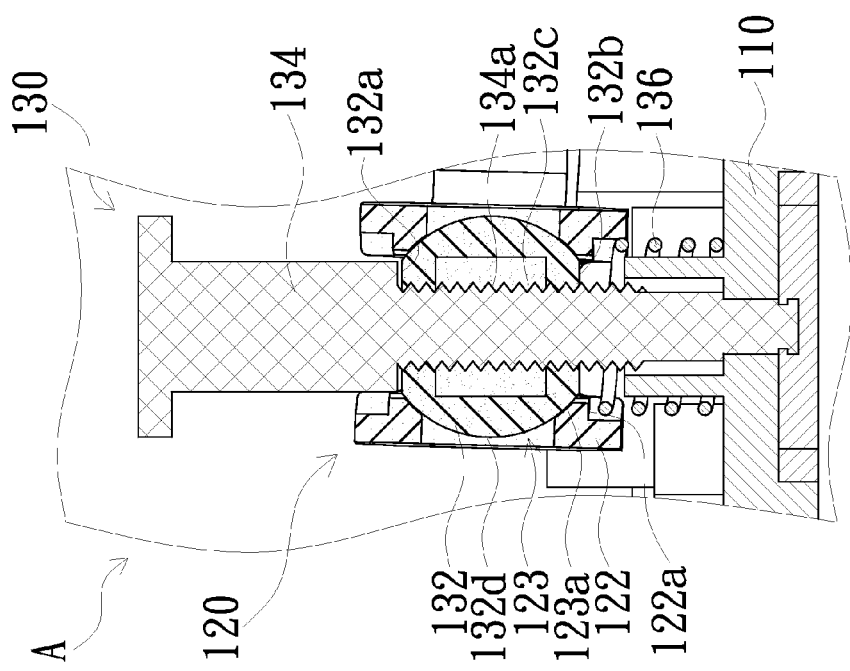
FIG. 4 is a schematic cross sectional view of part A of an adjusting structure in FIG. 3 along a line 4-4'.
Figure 5:
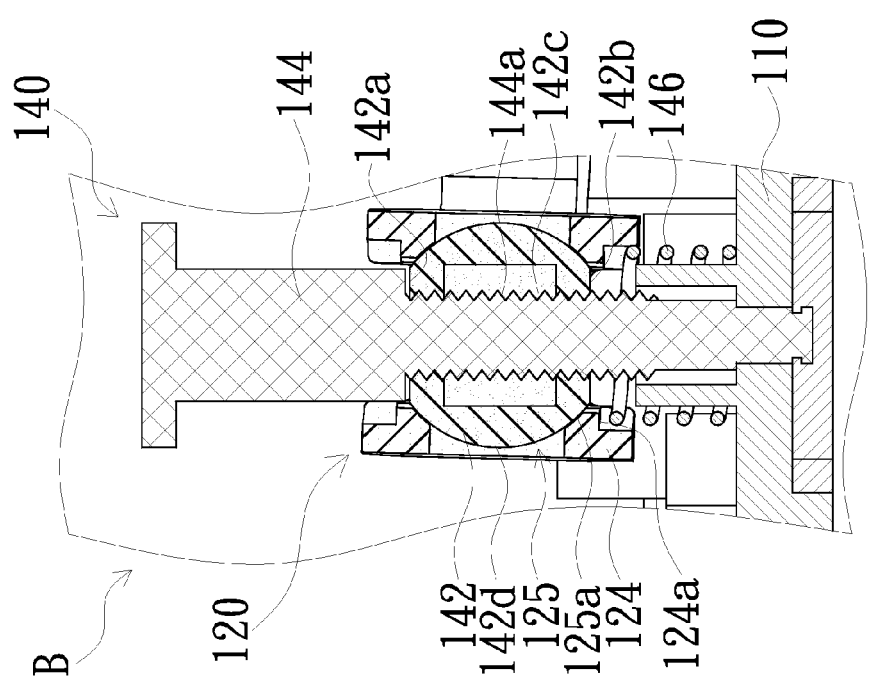
FIG. 5 is a schematic cross sectional view of part B of an adjusting structure in FIG. 3 along a line 5-5'.

FIG. 4 is a schematic cross sectional view of part A of the adjusting structure in FIG. 3 along a line 4-4' and FIG. 5 is a schematic cross sectional view of part B of the adjusting structure in FIG. 3 along a line 5-5'. Please refer to FIGS. 4 and 5. In this embodiment, the top surface 132a and the bottom surface 132b of the first spherical portion 132 are flat surfaces, and the top surface 142a and the bottom surface 142b of the second spherical portion 142 are also flat surfaces; however, the present invention is not limited thereto. The first connection element 130 further includes a first elastic element 136 mounted to the first rod 134 and abuts against the bottom surface 122a of the first connection portion 122 of the second plate 120 so that the two opposite sides of the first elastic element 136 abut against the first plate 110 and the first connection portion 122 of the second plate 120, respectively. The first connection portion 122 of the second plate 120 is pushed upward and abuts against the first spherical portion 132 by the elastic force of the first elastic element 136 to obtain close contact between threads 132c of the first spherical portion 132 and threads 134a of the first rod 134. Therefore, the threads 132c of the first spherical portion 132 are stably engaged with the threads 134a of the first rod 134. Similarly, the second connection element 140 further includes a second elastic element 146 mounted to the second rod 144 and abuts against the bottom surface 124a of the second connection portion 124 of the second plate 120 so that the two opposite sides of the second elastic element 146 abut against the first plate 110 and the second connection portion 124 of the second plate 120, respectively. The second connection portion 124 of the second plate 120 is pushed upward and abuts against the second spherical portion 142 by the elastic force of the second elastic element 146 to obtain close contact between threads 142c of the second spherical portion 142 and threads 144a of the second rod 144. Therefore, the threads 142c of the second spherical portion 142 are stably engaged with the threads 144a of the second rod 144. In this embodiment, the first elastic element 136 and the second elastic element 146 may be springs; however, the present invention is not limited thereto.

In one embodiment, the first connection portion 122 further includes a first slot 123 for containing the first spherical portion 132. The first slot 123 has a first arc surface 123a formed on the inner surface thereof; however, the present invention is not limited thereto. Similarly, the second connection portion 124 may further include a second slot 125 for containing the second spherical portion 142. The second slot 125 has a second arc surface 125a formed on the inner surface thereof. The first arc surface 123a and an outer surface 132d of the first spherical portion 132 are matched with each other in shape to provide a surface contact. In other words, the first arc surface 123a and the outer surface 132*d* of the first spherical portion 132 have corresponding shapes. The shapes of the inner surface of the first slot 123 and the outer surface 132*d* of the first spherical portion 132 in the present invention are not limited to arc surfaces. Similarly, the second arc surface 125*a* and an outer surface 142*d* of the second spherical portion 142 are matched with each other in shape to provide a surface contact. Therefore, by providing the surface contact between the first spherical portion 132 and the first connection portion 122 and the surface contact between the second spherical portion 142 and the second connection portion 124, the first spherical portion 132 and the second spherical portion 142 can provide stable support to the second plate 120 when operating the adjusting structure. Meanwhile, the first spherical portion 132 and the second spherical portion 142 can rotate with respect to the first slot 123 and the second slot 125, respectively more stably and smoothly.

Figure 6:
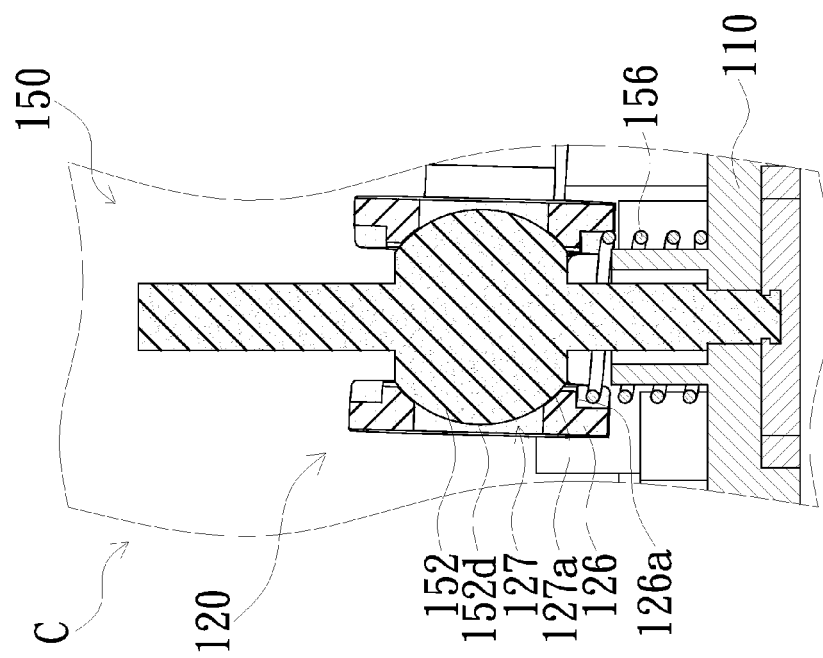
FIG. 6 is a schematic cross sectional view of part C of an adjusting structure in FIG. 3 along a line 6-6'.

Please refer to FIG. 6 which is a schematic cross sectional view of part C of the adjusting structure in FIG. 3 along a line 6-6'. As shown in FIG. 6, the third connection element 150 further includes a third elastic element 156 abutting against the bottom surface 126*a* of the third connection portion 126 of the second plate 120 so that the two opposite sides of the third elastic element 156 abut against the first plate 110 and the third connection portion 126 of the second plate 120, respectively. The third connection portion 126 of the second plate 120 is pushed upward and abuts against the third spherical portion 152 by the elastic force of the third elastic element 156. In this embodiment, the third connection portion 126 further includes a third slot 127 for containing the third spherical portion 152. The third slot 127 has a third arc surface 127*a* formed on the inner surface thereof. The third arc surface 127*a* and an outer surface 152*d* of the third spherical portion 152 are matched with each other in shape to provide a surface contact. In other words, the third arc surface 127*a* and the outer surface 152*d* of the third spherical portion 152 have corresponding shapes so as to provide stable support to the second plate 120 when operating the adjusting structure.

Figure 7:
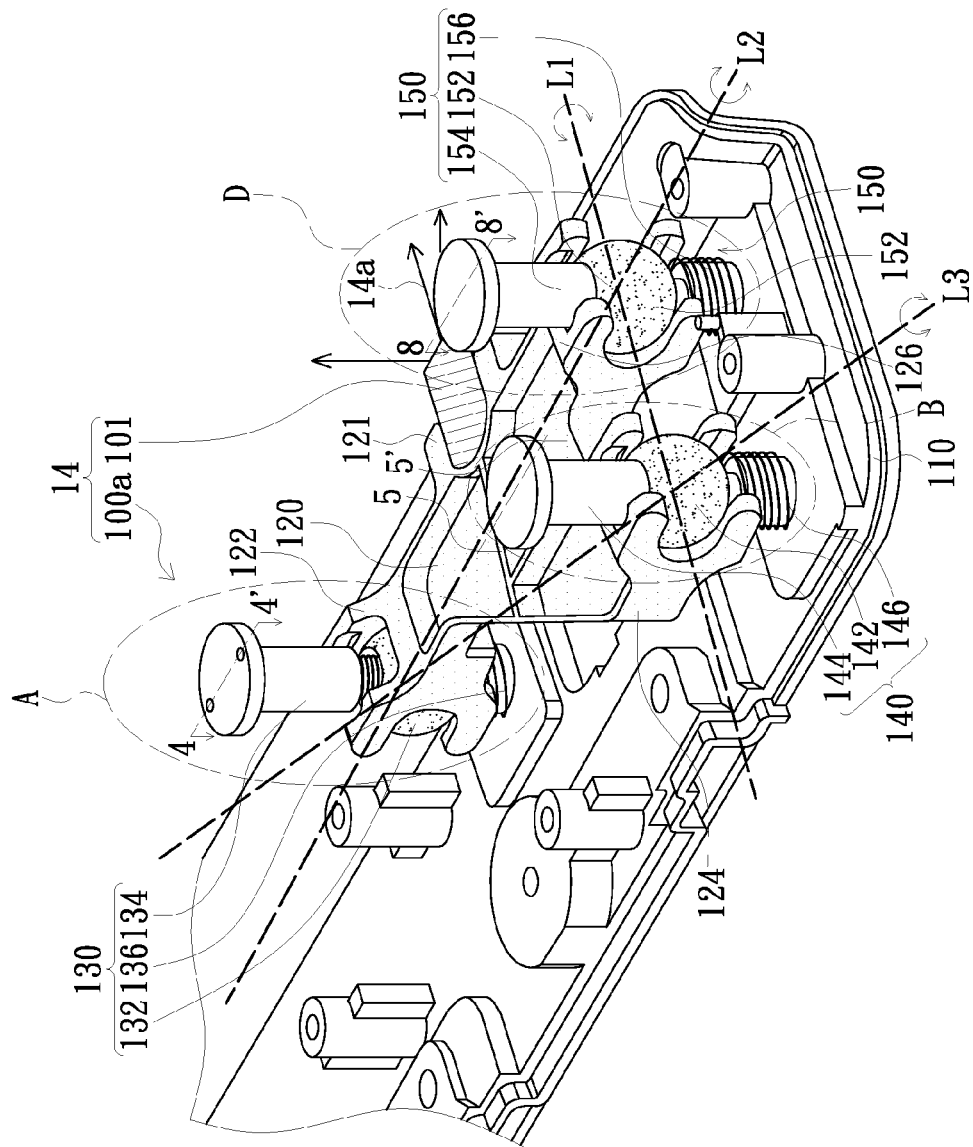
FIG. 7 is a schematic three-dimensional view of an embodiment of a light curtain generating module of the optical touch system in FIG. 1.
Figure 8:
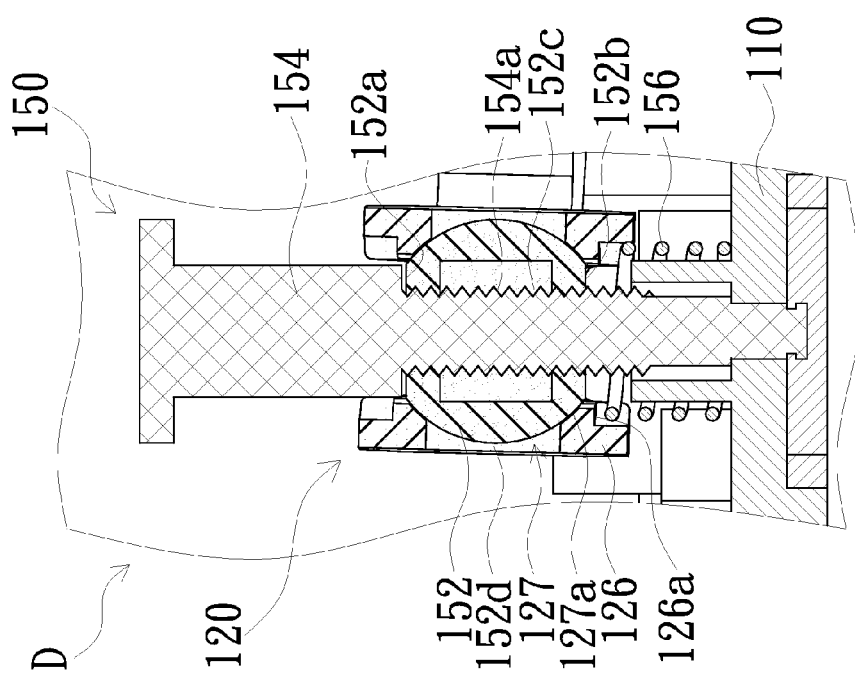
FIG. 8 is a schematic cross sectional view of D part of an adjusting structure in FIG. 7 along a line 8-8'.

FIG. 7 is a schematic three-dimensional view of the light curtain generating module of the optical touch system in FIG. 1 and FIG. 8 is a schematic cross sectional view of part D of the adjusting structure in FIG. 7 along a line 8-8' in accordance with another embodiment of the present invention. Please refer to FIGS. 7 and 8. In this embodiment, the third connection element 150 of an adjusting structure 100*a* includes the third rod 154 and the third spherical portion 152. The third spherical portion 152 has a through hole provided with threads. The third rod 154 passes through and is engaged with the third spherical portion 152 via, for example, screwing and is rotatably fixed to the first plate 110. The first connection portion 122 and the second connection portion 124 are located on a third axis L3. In other words, the connection line between the first connection portion 122 and the second connection portion 124 forms the third axis L3. The third spherical portion 152 of the third connection element 150 is engaged with the third rod 154. When the third rod 154 rotates, the third spherical portion 152 moves with respect to the third rod 154 and drives the third connection portion 126 of the second plate 120 so as to rotate the second plate 120 with respect to the first plate 110 about the third axis L3. For example, when the third spherical portion 152 is driven to rotate by the third rod 154 and move toward the first plate 110, the second plate 120 is driven to rotate toward the first plate 110 about the third axis L3, so that the third connection portion 126 of the second plate 120 is driven to be close to the first plate 110. Alternatively, when the third spherical portion 152 is driven to rotate by the third rod 154 and move away from the first plate 110, the second plate 120 is driven to rotate away from the first plate 110 along the third axis L3, so that the third connection portion 126 of the second plate 120 is driven to move away from the first plate 110. In this embodiment, the first axis L1, the second axis L2, and the third axis L3 are not parallel to one another; in other words, the first axis L1, the second axis L2, and the third axis L3 intersect one another.

In one embodiment, when the first rod 134, the second rod 144, and the third rod 154 corporately rotate to drive the first spherical portion 132, the second spherical portion 142, and the third spherical portion 152 to move a same distance with respect to the first rod 134, the second rod 144, and the third rod 154, respectively, if the second plate 120 is parallel to the first plate 110 before adjusting, the second plate 120 can moves the distance with respect to the first plate 110 while keeping parallel to the first plate 110. In other words, in addition to rotating with respect to the first plate 110 about the first axis L1, the second axis L2, or the third axis L3, in one embodiment, the second plate 120 can also in parallel move upward and downward after the first spherical portion 132, the second spherical portion 142, and the third spherical portion 152 move the same distance with respect to the first rod 134, the second rod 144 and the third rod 154, respectively. The light curtain 14*a* generated by the light-emitting device 101 can be in parallel moves upward and downward accordingly. After the light curtain 14*a* is adjusted to be parallel to the display surface 12 (as shown in FIG. 2), the adjusting structure 100*a* can further adjust the distance d1 (as shown in FIG. 2) between the light curtain 14*a* and the display surface 12 so that when a part of the light curtain 14*a* is reflected by the user's finger (or other object), the sensing module 16 can receive the reflected light curtain 14*a* completely to ensure that the optical touch system 10 (as shown in FIG. 2) can have stable touch sensitivity.

Moreover, in this embodiment, the top surface 152*a* and the bottom surface 152*b* of the third spherical portion 152 are flat surfaces; however, the present invention is not limited thereto. In this embodiment, the third connection element 150 further includes a third elastic element 156 mounted to the third rod 154 and abuts against the bottom surface 126*a* of the third connection portion 126 of the second plate 120 so that the two opposite sides of the third elastic element 156 abut against the first plate 110 and the third connection portion 126 of the second plate 120, respectively. The third connection portion 126 of the second plate 120 is pushed upward and abuts against the third spherical portion 152 by the elastic force of the third elastic element 156 to obtain close contact between threads 152*c* of the third spherical portion 152 and threads 154*a* of the third rod 154. Therefore, the threads 152*c* of the third spherical portion 152 are stably engaged with the threads 154*a* of the third rod 154. In this embodiment, the third elastic element 156 may be spring; however, the present invention is not limited thereto. Furthermore, the first spherical portion 132, the second spherical portion 142, and the third spherical portion 152 may be universal ball joints; however, the present invention is not limited thereto.

The distance between the light curtain generated by the optical touch system of the embodiments of the present invention and the display surface is adjustable by operating the first connection element and the second connection element of the adjusting structure. The light curtain can be approximately parallel to the display surface and keep a certain distance with display surface to obtain stable touch sensitivity. Because the first connection element, the second connection element and the third connection element are connected to the second plate by spherical portions respectively, the first connection element, the second connection element and the third connection element rotate to drive the second plate to rotate with respect to the first spherical portion, the second spherical portion and the third spherical portion stably. Therefore, the second plate can move or rotate with respect to the first plate stably to adjust exactly an emitting angle of the light curtain with respect to the display surface.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first stop part, the second stop part, the first ring part and the second ring part are only used for distinguishing various elements and do not limit the number of the elements.

What is claimed is:

1. An adjusting structure, comprising:
   a first plate;
   a second plate, wherein the first and the second plates are opposite to each other, the second plate is adapted to couple an optical element and comprises a first connection portion, a second connection portion, and a third connection portion;
   a first connection element, having a first spherical portion and a first rod, wherein the first spherical portion is rotatably coupled to the first connection portion of the second plate, and the first rod passes through and is engaged with the first spherical portion and is rotatably fixed to the first plate;
   a second connection element, having a second spherical portion and a second rod, wherein the second spherical portion is rotatably coupled to the second connection portion of the second plate, and the second rod passes through and is engaged with the second spherical portion and is rotatably fixed to the first plate; and
   a third connection element, connected to the second plate and the first plate and having a third spherical portion, the third spherical portion being rotatably coupled to the third connection portion of the second plate,
   wherein the second connection portion and the third connection portion are located on a first axis, the first connection portion and the third connection portion are located on a second axis,
   wherein the first spherical portion is adapted to move with respect to the first rod to drive the second plate to rotate with respect to the first plate about the first axis when the first rod rotates,
   wherein the second spherical portion is adapted to move with respect to the second rod to drive the second plate to rotate with respect to the first plate about the second axis when the second rod rotates, and
   wherein the first axis is not parallel to the second axis.

2. The adjusting structure according to claim 1, wherein the first spherical portion has a top surface and a bottom surface, and both of the top surface and the bottom surface of the first spherical portion are flat surfaces, and wherein the second spherical portion has a top surface and a bottom surface, and both of the top surface and the bottom surface of the second spherical portion are flat surfaces.

3. The adjusting structure according to claim 1, wherein the first connection element further comprises a first elastic element mounted to the first rod and abuts against a bottom surface of the first connection portion, and the second connection element further comprises a second elastic element mounted to the second rod and abuts against a bottom surface of the second connection portion.

4. The adjusting structure according to claim 1, wherein the first connection portion comprises a first slot for containing the first spherical portion, the first slot has a first arc surface formed on an inner surface thereof, the second connection portion comprises a second slot for containing the second spherical portion, the second slot has a second arc surface formed on an inner surface thereof, and the third connection portion comprises a third slot for containing the third spherical portion, the third slot has a third arc surface formed on an inner surface thereof.

5. The adjusting structure according to claim 4, wherein the first arc surface and an outer surface of the first spherical portion match with each other in shape, the second arc surface and an outer surface of the second spherical portion match with each other in shape, and the third arc surface and an outer surface of the third spherical portion match with each other in shape.

6. The adjusting structure according to claim 1, wherein the third connection element further comprises a third rod, the third rod passes through and is engaged with the third spherical portion and is rotatably fixed to the first plate, the first connection portion and the second connection portion are located on a third axis, the third spherical portion is adapted to move with respect to the third rod to drive the second plate to rotate with respect to the first plate about the third axis when the third rod rotates, and the first axis, the second axis, and the third axis are not parallel to one another.

7. The adjusting structure according to claim 6, wherein the third spherical portion has a top surface and a bottom surface, and both of the top surface and the bottom surface of the third spherical portion are flat surfaces.

8. The adjusting structure according to claim 6, wherein the third connection element further comprises a third elastic element mounted on the third rod and abuts against a bottom surface of the third connection portion.

9. The adjusting structure according to claim 6, the first rod, the second rod, and the third rod are adapted to corporately rotate to drive the first spherical portion, the second spherical portion, and the third spherical portion to move with a same distance with respect to the first rod, the second rod, and the third rods respectively so that the second plate is adapted to in parallel move with the same distance with respect to the first plate.

10. The adjusting structure according to claim 6, wherein the third rod has threads and the third spherical portion has threads, and the third rod is engaged with the third spherical portion via the threads of the third rod and the threads of the third spherical portion.

11. The adjusting structure according to claim 1, wherein the first rod has threads and the first spherical portion has threads, the first rod is engaged with the first spherical portion via the threads of the first rod and the threads of the first spherical portion, and wherein the second rod has threads and the second spherical portion has threads, the second rod is engaged with the second spherical portion via the threads of the second rod and the threads of the second spherical portion.

12. A light curtain generator, comprising: an adjusting structure, comprising:
a first plate;
a second plate, wherein the first plate and the second plate are opposite to each other, the second pate comprises a first connection portion, a second connection portion, and a third connection portion;
a first connection element, having a first spherical portion and a first rod, wherein the first spherical portion is rotatably coupled to the first connection portion of the second plate, and the first rod passes through and is engaged with the first spherical portion and is rotatably fixed to the first plate;
a second connection element, having a second spherical portion and a second rod, wherein the second spherical portion is rotatably coupled to the second connection portion of the second plate, and the second rod passes through and is engaged with the second spherical portion and is rotatably fixed to the first plate;
a third connection element, connected to the second plate and the first plate and having a third spherical portion, the third spherical portion being rotatably coupled to the third connection portion of the second plate,
wherein the second connection portion and the third connection portion are located on a first axis, the first connection portion and the third connection portion are located on a second axis, the first spherical portion is adapted to move with respect to the first rod to drive the second plate to rotate with respect to the first plate about the first axis when the first rod rotates, the second spherical portion is adapted to move with respect to the second rod to drive the second plate to rotate with respect to the first plate about the second axis when the second rod rotates, and the first axis is not parallel to the second axis; and
a light-emitting device, disposed on the second plate of the adjusting structure and capable of emitting a light curtain.

13. The light curtain generator according to claim 12, wherein the light-emitting device comprises a light-emitting element and the light-emitting element is a laser.

14. The light curtain generator according to claim 12, wherein the light curtain is adjusted to be parallel to a surface of the first plate by the adjusting structure.

15. The light curtain generator according to claim 12, wherein the third connection element further comprises a third rod, the third rod passes through and is engaged with the third spherical portion and is rotatably fixed to the first plate, the first connection portion and the second connection portion are located on a third axis, the third spherical portion is adapted to move with respect to the third rod to drive the second plate to rotate with respect to the first plate about the third axis when the third rod rotates, and the first axis, the second axis, and the third axis are not parallel to one another.

16. An optical touch system, comprising:
a light curtain generator; and
a sensor,
wherein the light curtain generator comprises:
an adjusting structure, disposed adjacent to a display surface
and comprising:
a first plate;
a second plate, wherein the first plate and the second plate are opposite to each other, the second plate comprises a first connection portion, a second connection portion, and a third connection portion;
a first connection element, having a first spherical portion and a first rod, wherein the first spherical portion is rotatably coupled to the first connection portion of the second plate, and the first rod passes through and is engaged with the first spherical portion and is rotatably fixed to the first plate;
a second connection element, having a second spherical portion and a second rod, wherein the second spherical portion is rotatably coupled to the second connection portion of the second plate, and the second rod passes through and is engaged with the second spherical portion and is rotatably fixed to the first plate;
a third connection element, connected to the second plate and the first plate and having a third spherical portion, the third spherical portion being rotatably coupled to the third connection portion of the second plate,
wherein the second connection portion and the third connection portion are located on a first axis, the first connection portion and the third connection portion are located on a second axis, the first spherical portion is adapted to move with respect to the first rod to drive the second plate to rotate with respect to the first plate along the first axis when the first rod rotates, the second spherical portion is adapted to move with respect to the second rod to drive the second plate to rotate with respect to the first plate along the second axis when the second rod rotates, and the first axis is not parallel to the second axis; and
a light-emitting device, disposed on the second plate of the adjusting structure and capable of emitting a light curtain,
wherein the sensor is adapted to receive a light beam reflected from the light curtain.

17. The optical touch system according to claim 16, wherein the light curtain is adjusted to be parallel to a surface of the first plate by the adjusting structure.

18. The optical touch system according to claim 16, wherein the third connection element further comprises a third rod, the third rod passes through and is engaged with the third spherical portion and is rotatably fixed to the first plate, the first connection portion and the second connection portion are located on a third axis, the third spherical portion is adapted to move with respect to the third rod to drive the second plate to rotate with respect to the first plate about the third axis when the third rod rotates, and the first axis, the second axis, and the third axis are not parallel to one another.

* * * * *